United States Patent Office 2,818,398
Patented Dec. 31, 1957

2,818,398

RESINOUS COMPOSITION COMPRISING AN ACRYLONITRILE POLYMER AND AN ETHERIFIED PHENOL CONDENSATION PRODUCT AND PROCESS OF MAKING THE SAME

Desmond Cleverdon, Tadworth, England, assignor to The Distillers Company Limited, Edinburgh, Scotland, a British company No Drawing. Application August 26, 1953
Serial No. 376,741

Claims priority, application Great Britain
September 3, 1952

6 Claims. (Cl. 260—43)

The present invention relates to resinous compositions containing polymerised acrylonitrile which possess improved dyeability and it further relates to solutions of these resinous compositions from which films and filaments may be obtained.

It is well known that acrylonitrile polymers, which expression includes polyacrylonitrile and copolymers of acrylonitrile containing more than about 85% of acrylonitrile units in their molecular structure, possess certain physical characteristics which make them very suitable for use in the production of films, filaments and the like. These advantageous physical properties are particularly the insolubility or, at most, the very low solubility in the usual organic solvents, the high softening point and the high tensile strength of the produced films or filaments. However, these films or filaments suffer from the disadvantage that they cannot readily be dyed with organic dyes.

In order to overcome this disadvantage of the acrylonitrile polymers it has been proposed to produce copolymers of acrylonitrile with certain other monomers capable of increasing the dye receptivity of the resulting copolymer. In this way fibres derived from acrylonitrile have been produced which have satisfactory dyeability, but it has generally been found that in order to obtain satisfactory dyeability so much co-monomer must be added to the acrylonitrile that the resultant copolymers show a considerable falling off in the advantageous physical properties required of fibre and film forming material. For instance, a copolymer of acrylonitrile and vinyl acetate containing 20% of the latter compound has satisfactory dyeability but has a low softening point and a reduced tensile strength and is no longer of great value for the production of films or fibres.

It has also been proposed to increase the dyeability of acrylonitrile polymers by mixing therewith other polymeric materials which are known to be dye-susceptible. Here again it has generally been found that when a sufficient quantity of a second polymer has been mixed with the polyacrylonitrile to give resinous compositions which will yield fibres with good dyeability the proportions of the acrylonitrile polymer to other polymer are such that segregation into the component polymers takes place either within the fibre or in the solution of the two polymers prior to its spinning. It has further been found that these two component polymer mixtures no longer possess the advantageous physical properties mentioned above to a sufficient degree to make the fibres and films produced therefrom of great commercial value. For instance, in order to obtain fibres with satisfactory dyeability from mixtures of polyacrylonitrile and polyvinyl acetate it is necessary to have at least 15% of the latter polymer present and it is found that such polymer mixtures when dissolved in N,N-dimethyl-formamide form a solution which on standing separates into two layers and that the fibres produced show segregation into their component polymers. This segregation is sometimes accompanied by voids, and always causes a considerable weakening of the fibre. Further, these fibres have too low softening temperatures to be of great practical value.

It will be seen, therefore, that the disadvantage of the methods mentioned above for the improvement of the dyeability of acrylonitrile polymers is that the resultant material no longer possesses all the above-mentioned physical characteristics to the degree desirable for fibre or film forming compositions.

Copending application Serial No. 363,409, filed June 22, 1953, disclosed that acrylonitrile polymers having improved dye-susceptibility yet still retaining the necessary physical characteristics for film and filament formation, namely low solubility in the usual organic solvents, high softening points and high tensile strength of the produced films or filaments, may be produced by the addition to the acrylonitrile polymer of small proportions of a compatible phenol-aldehyde condensation product. The resinous compositions according to this copending application have excellent dye-susceptibility but it has been found that they produce films and filaments of variable light stability.

The object of the present invention is to provide a composition derived from acrylonitrile polymers which has improved dye-susceptibility and yet still retains the above mentioned physical properties. It is a further object of the invention to provide a composition from acrylonitrile polymers which has good light stability.

It has now been discovered that certain etherified resins (as hereinafter defined), together with acrylonitrile polymers, form in solvents which will dissolve polyacrylonitrile, homogeneous solutions from which homogeneous films and filaments may be derived. The addition of small proportions of these etherified resins is sufficient to endow the resultant resinous composition with satisfactory dye-susceptibility without detracting to any serious extent from the aforementioned advantageous physical properties of the acrylonitrile polymers. These resinous compositions have good light stability.

Accordingly, the present invention provides a resinous composition comprising a mixture of an acrylonitrile polymer and not more than 10% by weight thereof of an uncured soluble etherified resin.

The expression "acrylonitrile polymer" includes polyacrylonitrile and copolymers of acrylonitrile containing more than 85% of acrylonitrile units in their molecular structure.

By the expression "etherified resin" is meant the product obtained by etherifying a low molecular weight phenol condensation product with a polyreactive etherifying agent such as epichlorhydrin, epibromhydrin, and α- and β-dichlorhydrins and dibromhydrins. Such etherified resins contain ether, hydroxy and epoxide groups.

The expression "low molecular weight phenol condensation product" means the products obtained by reacting a reactive phenol with a reactive carbonyl compound according to the following equations:

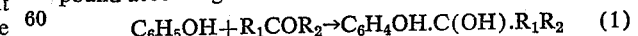
$$C_6H_5OH + R_1COR_2 \rightarrow C_6H_4OH.C(OH).R_1R_2 \quad (1)$$

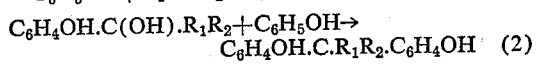
$$C_6H_4OH.C(OH).R_1R_2 + C_6H_5OH \rightarrow C_6H_4OH.C.R_1R_2.C_6H_4OH \quad (2)$$

wherein $R_1$ and $R_2$ are lower alkyl groups containing not more than 5 carbon atoms, or $R_1$ is an alkyl group and $R_2$ is a hydrogen atom. The low molecular weight phenol condensation product may be etherified to make the etherified resin either as a mono-phenylol (1) or as a di-phenylol (2) compound. Although the reactive phenol as illustrated in the above equations is phenol itself, other phenols having reactive hydrogen atoms in their para and/or ortho positions, such as the cresols; the 2:3-, 2:5- and 3:5-xylenols; para-tertiary butyl phenol; para-amyl phenol; para-n-octyl phenol and para-n-nonyl phenol may be employed.

Particularly suitable etherified resins are those resins known under the trade name "Epikote." Such resins will hereinafter be called "Epikote" resins. For example diphenylol propane may be etherified with epichlorhydrin to give polyhydroxyethers which are believed to have the formulae:

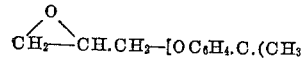—O C₆H₄—C.(CH₃)₂.C₆H₄—O—CH₂—CH

where the value of $n$ varies according to the reaction conditions. It will be seen that as the value of $n$ increases so does the ratio of hydroxyl groups to epoxide groups and vice versa and it has been found that Epikote resins with both high and low hydroxyl-epoxide ratios may be used in the production of the resinous compositions according to the present invention.

Other uncured etherified resins may be prepared by reacting phenolic material containing hydroxyalkyl phenols with a polyreactive polyhydric alcohol etherifying agent in an alkaline medium. The phenolic material containing hydroxy alkyl phenols is prepared by reacting a monohydric phenol containing at least two reactive positions with a saturated lower aliphatic aldehyde in the presence of an alkaline catalyst, and preferably at a temperature below 80° C.

For use in the preparation of the resinous compositions of the present invention the etherified resins of the present invention must be in the soluble and uncured state, that is, they must be soluble in solvents such as N,N-dimethyl-formamide, N,N-dimethylacetamide or other solvents as listed hereafter, and not have been cured by the action of heat and/or catalysts into insoluble thermoset resins.

The present invention is particularly concerned with the production of resinous compositions from polyacrylonitrile and from acrylonitrile copolymers having the advantageous physical properties, namely insolubility or very low solubility in the usual organic solvents, high softening point and high tensile strength, which are generally accepted in the art as prerequisites of material to be used for production of films, fibres and the like. Suitable copolymers of acrylonitrile may be prepared by polymerising acrylonitrile with one or more other copolymerisable mono-ethylenically unsaturated monomers, such as acrylic acid, methacrylic acid, maleic, fumaric and itaconic acids or their esters, amides or nitriles, vinyl esters, vinyl ethers, vinyl pyridines, vinyl ketones, vinyl halides and vinylidene halides.

The exact proportion of the polyhydroxy ether of the phenol condensation product to the acrylonitrile polymer in the resinous compositions of the present invention will depend upon the degree of dye-susceptibility required and the nature of the acrylonitrile polymer and the etherified resin employed. However, the proportion of etherified resin added should not be increased above 10% on the weight of acrylonitrile polymer present because there is then a tendency for separation of the mixed components to occur in the films or fibres finally formed. Generally, it is found that a resinous composition with satisfactory dye-susceptibility may be prepared by using not more than 5% of the etherified resin.

The resinous composition according to the present invention is preferably prepared by dissolving the acrylonitrile polymer and the etherified resin in a common solvent to give a solution which may then be evaporated to yield the resinous composition or which may be used directly in the formation of films, fibres and the like. The solution of the two components in the common solvent may be assisted by carrying out the operation at an elevated temperature.

Fibres and films may be prepared from the resinous composition of the present invention by any of the standard techniques which have heretofore been employed most suitably by dissolving the resinous composition in suitable solvent and allowing the solvent to evaporate disperse. Films may be prepared by applying a solution of the resinous composition to a surface and allowing the solvent to evaporate. Fibres may be prepared by extruding a solvent solution of the resinous composition into hot air where the solvent evaporates, leaving the resinous composition in the form of a fibre. It will be appreciated that fibres and films produced from the resinous compositions of the present invention by the processes described above will retain small proportion of the solvent adsorbed thereto. Such residual solvent does not have any deleterious effect upon the physical properties of the produced shaped articles and, in fact it is believed that some of the advantageous properties of the films and fibres are, at least to some extent, dependent on the presence of this residual solvent.

As has been stated before, acrylonitrile polymers are not soluble in the usual organic solvents and consequently the resinous compositions according to the present invention can only be dissolved in solvents such as N,N-dimethylformamide, N,N-dimethylacetamide, ethylene carbonate, ethylene carbamate, N-methyl-2-pyrrolidone, gamma-butyrolactone. Other solvents such as N,N-dimethylmethoxyacetamide, dimethylcyanamide, N,N-dimethylcyanoacetamide, N,N-dimethyl-beta-cyanopropionamide, glycolonitrile (formaldehyde cyanohydrin), malononitrile, ethylenecyanohydrin, dimethylsulphoxide, dimethyl sulphone, tetramethylene sulphone, tetramethylene sulphoxide, N-formylpyrrolidine, N-formylmorpholine, N,N'-tetramethylmethanephosphonamide and aqueous nitromethane may also be used, although generally speaking the resinous compositions are not so soluble in these solvents.

As has already been stated it has often been found that when attempts are made to dissolve an acrylonitrile polymer mixed with another resinous compound in a suitable solvent, for example N,N-dimethylformamide, the initially formed solution separates into two layers on standing. It has been found that acrylonitrile polymers mixed with up to 30% by weight of an etherified resin may be dissolved in a suitable solvent and that the resultant solution shows no tendency to form two layers.

The following examples illustrate the preparation and use of the resinous compositions of the present invention, the parts referred to being by weight:

*Example 1*

A mixture of 9.5 parts of polyacrylonitrile and 0.5 part of an etherified resin, sold under the trade name "Epikote RN34" (obtained by the etherification of diphenylol propane with epichlorhydrin), is dissolved in 100 parts of dimethylformamide to give a solution from which a film of .002 inch thickness is prepared by casting and drying at 80° C. A similar film is prepared from a solution of polyacrylonitrile not containing the Epikote resin.

Both films are completely clear and homogeneous and remain so after exposure to the light of a carbon arc for 70 hours.

The dye-susceptibility of the two films is compared by contacting them with a 1% aqueous suspension of "Cellitongelb 3G" as manufactured by the I. G. Farbenindustrie Akt. Ges. (Deutsche Färbezeit. [1934] 70, 308), for 1 hour at 100° C. The films are washed in boiling water and dried. The pure polyacrylonitrile film acquires a pale lemon tint, while the film containing the etherified resin acquires a deep yellow colour.

Similar films made from mixtures containing from 1 to 10% of the Epikote resin all show improved dye-susceptibility over pure polyacrylonitrile although the depth to which they are coloured by the dyeing process varies with the proportion of Epikote resin in the composition.

*Example 2*

The procedure of Example 1 is repeated using an etherified resin sold under the name of Epikote 1004, in place of the etherified resin Epikote RN34. A film is obtained showing similar good light stability and dye-susceptibility.

The two etherified resins used in Examples 1 and 2 are both obtained by etherifying diphenylol propane with epichlorhydrin. They differ from each other in that the product sold under the name Epikote RN34 has a higher hydroxyl:epoxide group ratio than that sold under the name Epikote 1004.

*Example 3*

An etherified resin is prepared by the following procedure: 282 parts of phenol is dissolved in a solution of 120 parts of sodium hydroxide dissolved in 300 parts of water, and 360 parts of a 40% weight/volume aqueous formaldehyde solution is added while the temperature of the resultant mixture is maintained at 28° C. Stirring is carried on for 30 minutes and the batch is then allowed to stand at room temperature for 18 hours. 300 parts of epichlorhydrin is then introduced with continuous stirring and the temperature increased to 50° C. and maintained at 50–60° C. for 6 hours. Stirring is stopped and separation occurs, the etherified product forming the lower layer. The non-aqueous layer is removed, washed with 500 parts of acetic acid solution followed by two successive lots of 1,000 parts of distilled water. This product is then dehydrated at a pressure of 2.5 cm. of mercury to a temperature of 95° C. to yield the polyhydroxy ether as a clear, water white, viscous liquid.

This etherified resin is then mixed in solution in dimethylformamide with polyacrylonitrile in the ratio of 0.5 part of ether to 9.5 parts of polyacrylonitrile and the resultant mixture is cast into films which are tested for dye-susceptibility by the procedure described in Example 1. The films containing the etherified resin are dyed a deep yellow while films similarly prepared from pure polyacrylonitrile are dyed a pale yellow tint.

*Example 4*

An etherified resin is prepared by the following procedure: 81 parts of para-tertiary butyl phenol is dissolved in a mixture of 60 parts of a 40% weight/volume aqueous formaldehyde solution, 22 parts of sodium hydroxide and 150 parts of water which has been previously heated to 40° C. The mixture is then allowed to react with stirring for 24 hours. 50 parts of epichlorhydrin are then added, and the mass is heated to 95° C. in 1 hour. Reaction is allowed to proceed without further heating for 1 hour, during which time the temperature falls to 30° C. Stirring is stopped and the aqueous layer removed. The non-aqueous material is then washed with four successive portions of 200 parts of water until the pH of the final washing is 7.0. The non-aqueous layer is dehydrated by heating to a temperature of 150° C. under a pressure of 20 mm. mercury to yield 110 parts of a clear straw coloured resin with softening point of 54° C. (Ball and Ring).

This etherified resin is then mixed in solution in dimethyl formamide with polyacrylonitrile in the ratio of 0.5 part of ether to 9.5 parts of polyacrylonitrile and the resultant mixture is cast into films. These films are then tested for dye-susceptibility by the procedure described in Example 1 using the dye Dispersol fast scarlet B/150 (as manufactured by the I. C. I. Ltd. Dyestuffs Division; see for example British Patent No. 226,948) in place of the "Cellitongelb 3G." The films containing the etherified resin are dyed scarlet while similarly prepared polyacrylonitrile films are dyed pale pink.

In the foregoing examples essentialy similar results are obtained showing the improvement to the dye-susceptibility of acrylonitrile polymers brought about by the addition of etherified resins, if the polyacrylonitrile polymer used is replaced with a copolymer of acrylonitrile containing 10% of vinyl acetate or vinyl benzoate or containing 5% vinyl pyridine.

I claim:

1. A resinous composition comprising a mixture of two components (a) and (b), (a) being an acrylonitrile polymer selected from the group consisting of polyacrylonitrile and copolymers of acrylonitrile containing more than 85% of acrylonitrile units and up to 15% of monoethylenically unsaturated monomer units in their molecular structure, and (b) being an uncured soluble etherified resin obtained by etherifying diphenylol propane with epichlorhydrin said etherified resin being present in an amount not greater than 10% of the acrylonitrile polymer.

2. A resinous composition comprising a mixture of two components (a) and (b), (a) being polymer of acrylonitrile containing at least 85% of acrylonitrile units and up to 15% of monoethylenically unsaturated monomer units and (b) being an uncured soluble etherified resin obtained by etherifying a condensation product of a phenol and a carbonyl compound selected from the group consisting of ketones and aldehydes with an etherifying agent selected from the group consisting of epichlorhydrin, epibromhydrin and α- and β-dichlorhydrins and dibromhydrins, said etherified resin being present in an amount not greater than 10% of the acrylonitrile polymer.

3. Fibres of improved dye susceptibility consisting essentially of a resinous composition as claimed in claim 2.

4. A resinous mixture comprising a resinous composition as claimed in claim 2 and a solvent therefor.

5. Films of improved dye-susceptibility consisting essentially of a resinous composition as claimed in claim 2.

6. A process for the production of a resinous composition as claimed in claim 2 which comprises mixing the acrylonitrile polymer and the etherified resin in a common solvent and evaporating solvent from the solution so produced.

References Cited in the file of this patent

UNITED STATES PATENTS

| | | |
|---|---|---|
| 2,602,785 | Wiles et al. | July 8, 1952 |
| 2,604,464 | Segall et al. | July 22, 1952 |
| 2,707,177 | Skiff et al. | Apr. 26, 1955 |